J. A. & C. T. DESJARDINS.
CAMERA.
APPLICATION FILED SEPT. 7, 1915. RENEWED MAR. 23, 1917.

1,223,858.

Patented Apr. 24, 1917.
3 SHEETS—SHEET 1.

WITNESSES
C. Patenaude
L. Deshaies

INVENTORS
J. A. Desjardins & C. T. Desjardins.
by
Henri A. Pigeon
ATTORNEY

J. A. & C. T. DESJARDINS.
CAMERA.
APPLICATION FILED SEPT. 7, 1915. RENEWED MAR. 23, 1917.

1,223,858.

Patented Apr. 24, 1917.
3 SHEETS—SHEET 3.

WITNESSES
C. Patenaude
L. Duhaies

INVENTORS
J. A. Desjardins & C. T. Desjardins.
by
Jess G. Pigeon
ATTORNEY

UNITED STATES PATENT OFFICE.

JOSEPH ANATOLE DESJARDINS AND CHARLES TANCRÈDE DESJARDINS, OF SOREL, QUEBEC, CANADA.

CAMERA.

1,223,858. Specification of Letters Patent. Patented Apr. 24, 1917.

Application filed September 7, 1915, Serial No. 49,370. Renewed March 23, 1917. Serial No. 156,868.

*To all whom it may concern:*

Be it known that we, JOSEPH ANATOLE DESJARDINS and CHARLES TANCRÈDE DESJARDINS, both subjects of the King of Great Britain, and residents in Sorel, in the Province of Quebec, Canada, have invented certain new and useful Improvements in Cameras; and we do hereby declare that the following is a full, clear, and exact description of the same.

The invention to be hereinafter described relates to improvements in cameras.

In order to more clearly disclose the construction, operation and use of the invention reference should be had to the accompanying drawings forming part of the present application. Throughout the several figures of the drawings like reference characters designate the same parts.

In the drawings:—

The main object of the invention is to provide a simple, efficient, compact, durable, and inexpensive device whereby the film sheet must be advanced the full distance for one exposure before the next exposure can be made, thus absolutely preventing two or more exposures on the same portion of the film sheet.

Figure 1:
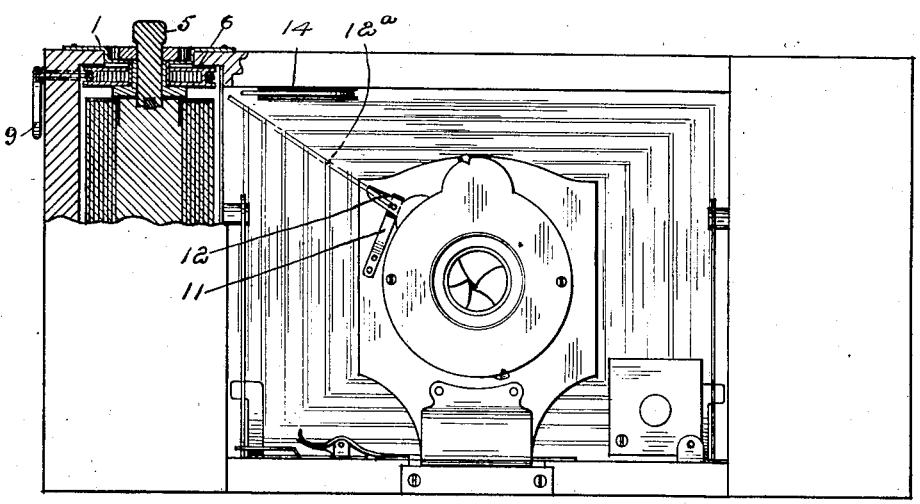
Figure 1 is a front view of a camera with the invention applied.
Figure 2:
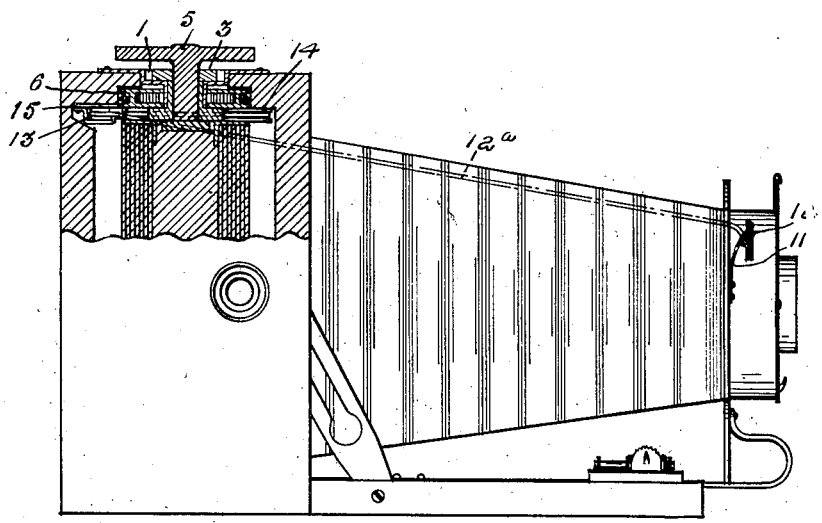
Fig. 2 is a side view of the same, partly broken away.
Figure 3:
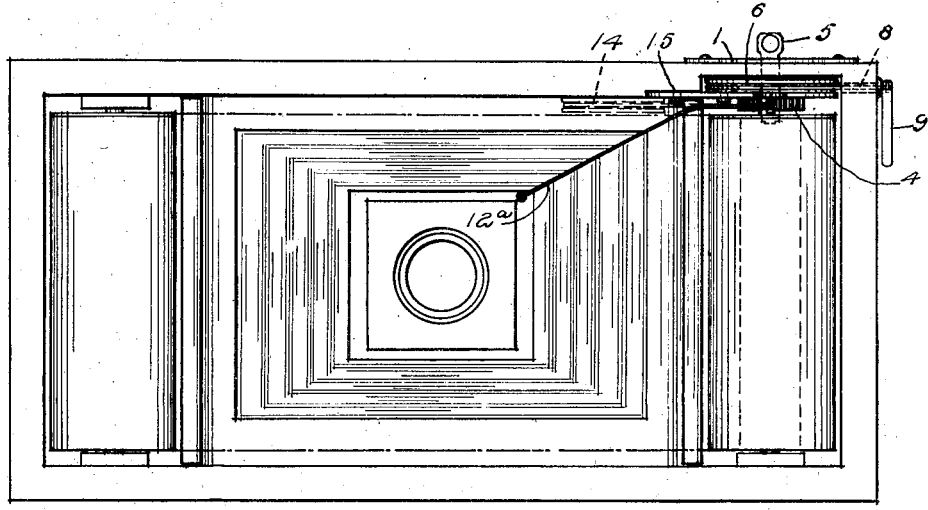
Fig. 3 is a rear plan view, with the camera open.
Figure 4:
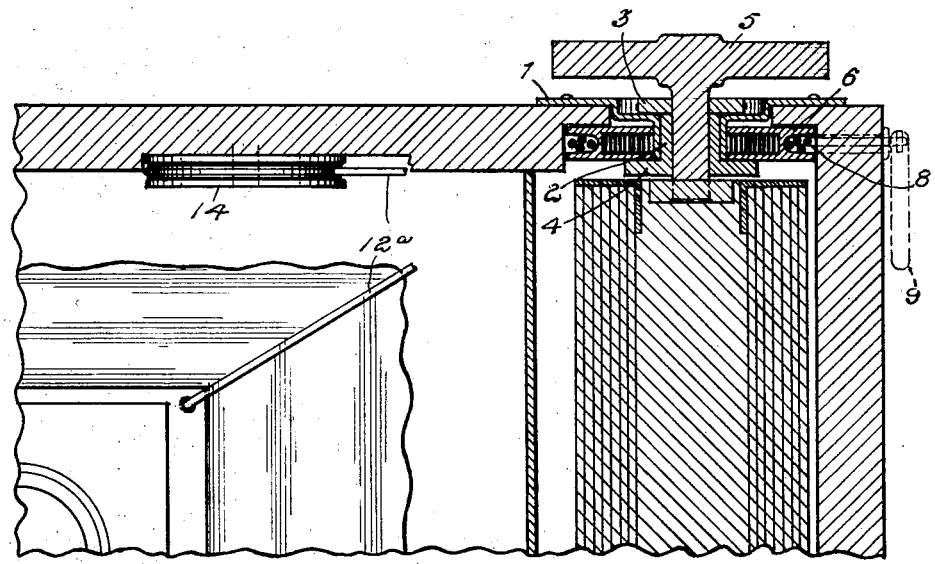
Fig. 4 is an enlarged, fragmentary vertical cross section, taken centrally through the film receiving roller and coöperating parts.
Figure 5:
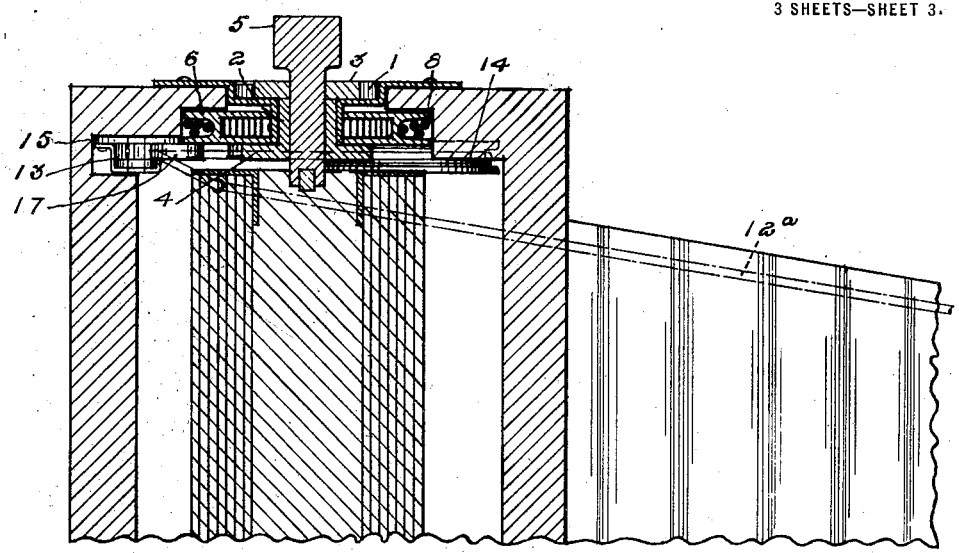
Fig. 5 is a similar view taken laterally, at right angles to Fig. 4.
Figure 6:
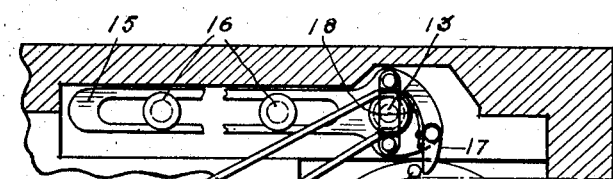
Fig. 6 is a bottom plan view of the film roller actuating device and coöperating parts.

In place of the usual key plate for the film receiving roller, a flanged and countersunk thimble 1 is substituted. It is fastened to the camera box by screws or any other suitable means, as will be obvious. Within the thimble is journaled a spool having a barrel or cylinder 2 provided with a squared or other non-circular bore. The two heads or ends of the spool are provided peripherally with ratchet teeth so that they really constitute upper and lower ratchets 3 and 4, with teeth pointing in the same direction. This spool is adapted to rotate freely in the thimble, as will be clear on reference to Figs. 4 and 5. Slidably mounted in the bore of the spool, but rotatable therewith, is the usual winding key 5 which connects in the usual way with the film receiving roller. About the barrel of the thimble and freely revoluble thereon and in the upper face of the lower head of the spool is a hollow driving pulley 6, with a return watch spring inside having its opposite ends secured, respectively to the pulley and to the thimble barrel. This pulley carries, on its lower face, a spring pressed pawl 7 adapted to engage the teeth of ratchet 4 and cause the spool to rotate with the pulley when the pulley is rotated in a counter-clockwise direction, but adapted to slip freely over the ratchet teeth when the return spring rotates the pulley in the opposite direction. For rotating the pulley against the action of the spring, a suitable cord or the like 8 is provided. This cord is led through a suitable opening in the end of the camera box and has one end secured to the pulley, while a finger ring 9 or other suitable grip is made fast to the opposite end. Preferably, the length of the cord is just sufficient to cause the receiving roller to wind up as much of the film as is required for a single exposure.

To prevent any possible return action of the receiving roller, as the spring returns the pulley 6, a second spring pressed pawl 10 engages the ratchet teeth of the upper head of the spool, locking it against reverse rotation. As will be clear, the key 5 may be operated in the usual way to rotate the receiving roller and cause it to wind up the film in the usual way. Its operation is in no way interfered with or changed by this invention. In fact, it coöperates thoroughly with this invention. Obviously, every time the cord 8 is drawn out its full length, the film will be wound in on the receiving roller to the full extent of one exposure.

Figures 7, 8:
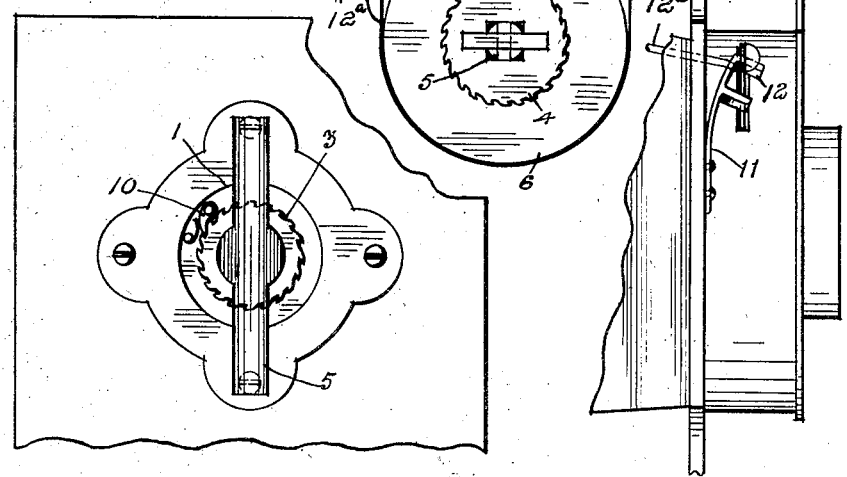
Fig. 7 is a top plan view of the film roller actuating device.
Fig. 8 is an enlarged side view of the shutter locking device.

To prevent operation of the shutter until the film has been wound for the preceding exposure, a shutter lever lock and release has been devised. A spring arm 11 having a fork 12 is adapted to engage the shutter lever when in its neutral or inoperative position and prevent it from being operated. This, of course, prevents making an exposure. The normal tendency of the arm is outward to the full line position of Fig. 8. To free the shutter lever so that an exposure may be made, it is necessary to draw the arm 11 back against its normal spring action. For this purpose, a cord 12ª is used. One end of this cord is passed through an opening in a flange of the shutter case and connected to the arm 11. The cord runs from there up through the bellows, is passed about a small guide roller 13 and, finally, has its opposite end made fast to a spring actuated winding drum or pulley 14, the spring of which is sufficient to wind up the cord as the bellows is collapsed, but not strong enough to affect the spring arm 11. Guide roller 13 also acts as a friction roller, as will later appear. It is mounted on a slotted plate 15 slidably mounted on studs or headed pins 16. On one end of this plate is pivoted a dog 17, provided with a leaf spring or thin strip of metal 18 adapted, under certain conditions, to engage the cord 12ª and bind it against the roller 13, to prevent it from passing about the roller. This dog is adapted to be engaged by a pin 19 on the pulley 6, the pin being so positioned that it engages the dog 17 just prior to completion of the winding up action of the cord 8. As the pin 19 engages the dog 17, the spring 18 will bind roller 13, and at the same time the spring will prevent the dog from turning to escape the pin. Consequently, the dog will be drawn along with pin 19. This, of course, will cause the plate 15 to slide lengthwise, carrying with it the cord 12ª and causing it to pull the arm 11 and free the shutter lever. The parts are so proportioned and arranged that the pull on the spring arm will be made just at the instant that the winding up action of the film receiving roller is completed.

The operation is as follows:—Assuming that the first exposure has been made and the shutter lever is in the fork of the arm 11, the cord 8 will be pulled to its full extent. This operates the receiving roller to wind up that exposure and, at its completion, withdraws arm 11 to free the shutter lever for the next exposure, the return spring of pulley 6 acting to wind in the cord 8 for the next operation.

Needless to state, if the key 5 is used in the usual way one or more complete exposures should be wound up by it. Its operation should not be stopped at a partial exposure because, in that case, every subsequent operation by the cord 8 would cause overlapping of two exposures with a complete running of all exposures of that film.

It is thought that the construction, operation and use of the invention will be clear from the preceding detailed description.

Changes may be made in the construction, arrangement, and disposition of the several parts of the invention without in any way departing from the field and scope of the same and it is meant to include all such within this application wherein only a preferred form has been disclosed.

Having thus described our invention, what we claim and desire to protect by Letters-Patent is:—

1. In a photographic apparatus, the combination with a casing provided with a shutter, of a film receiving roller mounted in said casing, a shutter operating lever, a spring arm on said casing having a fork to engage said lever, a cord for operating said spring arm, means for rotating the film receiving roller to the full extent of an exposure for each exposure, and means carried thereby and adapted to engage and actuate the aforesaid cord.

2. In a photographic apparatus, the combination with a casing provided with a shutter, of a film receiving roller mounted in said casing, a shutter operating lever, a spring arm on said casing having a fork to engage said lever, pawl and ratchet mechanism connected to said casing to rotate said roller, means for actuating said pawl and ratchet mechanism, a cord for operating said spring arm, a slide plate on said casing for operating said cord, and means connected to said pawl and ratchet mechanism for actuating said slide plate.

3. In a photographic apparatus, the combination with a casing provided with a shutter, of a film receiving roller mounted in said casing, a shutter operating lever, a spring arm on said casing having a yoke adapted to engage said shutter lever, a cord for operating said arm, pawl and ratchet mechanism connected to said casing for rotating said receiving roller, a pulley connected to said casing for driving the pawl and ratchet mechanism, means for operating said pulley to a pre-determined extent, means for returning said pulley after each operation, a slide plate on said casing for actuating said cord, and connections between said plate and said pulley for operating said plate.

4. In a photographic apparatus, the combination with a casing provided with a shutter, of a film receiving roller mounted in said casing, a shutter operating lever, a spring arm on said casing provided with a yoke adapted to engage said shutter lever, a cord for operating said spring arm, pawl and ratchet mechanism connected to said casing for rotating the receiving roller, a pulley connected to said casing for driving said pawl and ratchet mechanism, means for operating said pulley to a pre-determined extent, means for returning said pulley after each operation, a slide plate on said casing for operating said cord, a dog carried by said plate and a pin carried by said pulley adapted to engage said dog.

5. In a photographic apparatus, the combination with a casing provided with a shutter, a film receiving roller mounted in said casing, a shutter operating lever, a spring arm on said casing provided with a yoke adapted to engage said shutter lever, a cord for operating said spring arm, pawl and ratchet mechanism connected to said casing to rotate the receiving roller, a pulley mounted in said casing for driving said pawl and ratchet mechanism, means for operating said pulley to a pre-determined extent, means for returning said pulley after each operation, a slide plate on said casing for actuating said cord, a guide pulley mounted on said slide plate, a dog carried by said slide plate, a spring carried by said dog and adapted to engage said cord and bind it against said guide pulley, and a pin carried by the aforesaid pulley adapted to engage said dog.

Signed at the city of Sorel, Province of Quebec, this sixth day of August, 1915.

JOSEPH ANATOLE DESJARDINS.
CHARLES TANCRÈDE DESJARDINS.

Witnesses:
   AMANDA LACOUTURE,
   TRINE LACOUTURE.